US011624556B2

(12) United States Patent
Naumovitz

(10) Patent No.: US 11,624,556 B2
(45) Date of Patent: Apr. 11, 2023

(54) IMPURITY CONTROL FOR A HIGH PRESSURE $CO_2$ PURIFICATION AND SUPPLY SYSTEM

(71) Applicant: Messer Industries USA, Inc., Bridgewater, NJ (US)

(72) Inventor: Joseph Naumovitz, Lebanon, NJ (US)

(73) Assignee: Messer Industries USA, Inc., Wilmington, DE (US)

(*) Notice: Subject to any disclaimer, the term of this patent is extended or adjusted under 35 U.S.C. 154(b) by 668 days.

(21) Appl. No.: 16/599,216

(22) Filed: Oct. 11, 2019

(65) Prior Publication Data

US 2020/0355430 A1 Nov. 12, 2020

Related U.S. Application Data

(60) Provisional application No. 62/843,840, filed on May 6, 2019.

(51) Int. Cl.
*F25J 3/08* (2006.01)

(52) U.S. Cl.
CPC .............. *F25J 3/08* (2013.01); *F25J 2200/02* (2013.01); *F25J 2200/40* (2013.01);
(Continued)

(58) Field of Classification Search
CPC .... F25J 3/067; F25J 2270/90; F25J 2270/902; F25J 2270/908; F25J 2270/912; F25J 2200/90; F25J 2215/80; F25J 2220/80; F25J 2220/82; F25J 2220/84; F25J 2205/30; F25J 3/02; F25J 3/0266; F25J 3/04141;
(Continued)

(56) References Cited

U.S. PATENT DOCUMENTS 3,420,633 A 1/1969 Lee
3,614,872 A 10/1971 Tassonet et al.
(Continued)

FOREIGN PATENT DOCUMENTS

EP 0417922 B1 5/1994
GB 2174379 A 11/1986
(Continued)

*Primary Examiner* — Jianying C Atkisson
*Assistant Examiner* — For K Ling
(74) *Attorney, Agent, or Firm* — Joshua L. Cohen

(57) ABSTRACT

An apparatus for producing a purified, pressurized liquid carbon dioxide stream includes a distillation column (B) having packing (C) therein and a sump (D) below the packing, the distillation column in fluid communication with the liquid carbon dioxide supply tank for receiving the liquid carbon dioxide stream and the packing stripping volatile impurities from the liquid carbon dioxide stream; a heater (E) in contact with the liquid carbon dioxide stream in the sump (D) for vaporizing the liquid carbon dioxide stream in the sump; a vent in the distillation column (B) from which a first vaporized portion (G) of carbon dioxide vapor in the sump (D) is withdrawn from the distillation column: and a conduit (I) in fluid communication with the sump (D) and from which a second vaporized portion (H) of the carbon dioxide vapor in the sump is withdrawn into the conduit (I) to be introduced into the carbon dioxide vapor feed stream.

21 Claims, 4 Drawing Sheets

(52) U.S. Cl.
CPC ........ *F25J 2200/90* (2013.01); *F25J 2200/94* (2013.01); *F25J 2205/60* (2013.01); *F25J 2205/84* (2013.01); *F25J 2210/80* (2013.01); *F25J 2215/80* (2013.01); *F25J 2220/02* (2013.01); *F25J 2230/80* (2013.01); *F25J 2235/80* (2013.01); *F25J 2250/00* (2013.01)

(58) Field of Classification Search
CPC .. F25J 3/04242; F25J 3/04909; F25J 3/04927; C01B 32/50; B01D 2256/22; B01D 3/14; B01D 3/16
See application file for complete search history.

(56) References Cited

U.S. PATENT DOCUMENTS

| | | | |
|---|---|---|---|
| 4,152,130 A | 5/1979 | Theobald | |
| 4,337,071 A | 6/1982 | Yang | |
| 4,349,415 A | 9/1982 | DeFilippi et al. | |
| 4,417,449 A | 11/1983 | Hegarty et al. | |
| 4,639,257 A | 1/1987 | Duckett et al. | |
| 4,717,406 A | 1/1988 | Giacobbe | |
| 4,805,412 A | 2/1989 | Colley et al. | |
| 4,806,171 A | 2/1989 | Whitlock et al. | |
| 4,934,147 A * | 6/1990 | Eyre | F25J 3/08 62/656 |
| 5,028,273 A | 7/1991 | Weltmer, Jr. et al. | |
| 5,151,119 A | 9/1992 | Clements et al. | |
| 5,339,844 A | 8/1994 | Standford, Jr. et al. | |
| 5,520,000 A | 5/1996 | Pevzner | |
| 5,582,029 A | 12/1996 | Occhialini et al. | |
| 5,735,141 A | 4/1998 | Whitlock | |
| 5,775,127 A | 7/1998 | Zito | |
| 5,822,818 A | 10/1998 | Chao et al. | |
| 5,881,557 A | 3/1999 | Shields | |
| 5,924,291 A | 7/1999 | Weiler et al. | |
| 5,925,326 A | 7/1999 | Kapoor et al. | |
| 5,934,081 A | 8/1999 | Notaro et al. | |
| 5,937,655 A | 8/1999 | Weiler et al. | |
| 5,970,554 A | 10/1999 | Shore et al. | |
| 5,974,829 A | 11/1999 | Novak et al. | |
| 6,044,647 A | 4/2000 | Drube et al. | |
| 6,065,306 A | 5/2000 | Ji et al. | |
| 6,082,150 A | 7/2000 | Stucker | |
| 6,087,507 A | 7/2000 | Laitinen et al. | |
| 6,164,088 A | 12/2000 | Moriguchi et al. | |
| 6,216,302 B1 | 4/2001 | Preston et al. | |
| 6,221,830 B1 | 4/2001 | Miller et al. | |
| 6,274,779 B1 | 8/2001 | Merkel et al. | |
| 6,327,872 B1 | 12/2001 | Boyd et al. | |
| 6,336,331 B1 | 1/2002 | White et al. | |
| 6,387,161 B1 | 5/2002 | Zhou et al. | |
| 6,505,469 B1 | 1/2003 | Drube et al. | |
| 6,542,848 B1 | 4/2003 | Neeser et al. | |
| 6,612,317 B2 | 9/2003 | Costantini et al. | |
| 6,640,556 B2 | 11/2003 | Ursan et al. | |
| 6,681,764 B1 | 1/2004 | Honkonen et al. | |
| 6,698,423 B1 | 3/2004 | Honkonen et al. | |
| 6,742,517 B1 | 6/2004 | Frye et al. | |
| 6,802,961 B2 | 10/2004 | Jackson | |
| 6,960,242 B2 * | 11/2005 | Leitch | B01D 53/261 62/928 |
| 7,055,333 B2 | 6/2006 | Leitch et al. | |
| 10,197,328 B2 | 2/2019 | Briglia et al. | |
| 2001/0050096 A1 | 12/2001 | Constantini et al. | |
| 2003/0072690 A1 | 4/2003 | Rover et al. | |
| 2003/0161780 A1 | 8/2003 | Howard et al. | |
| 2004/0112066 A1 * | 6/2004 | Leitch | F25J 3/08 62/48.1 |
| 2008/0173584 A1 * | 7/2008 | White | F25J 3/0223 210/656 |

FOREIGN PATENT DOCUMENTS

| | | |
|---|---|---|
| JP | 355020206 A | 2/1980 |
| JP | 57175716 A | 10/1982 |
| JP | 360066000 A | 4/1985 |
| JP | 361027397 A | 2/1986 |

* cited by examiner

IMPURITY CONTROL FOR A HIGH PRESSURE $CO_2$ PURIFICATION AND SUPPLY SYSTEM

BACKGROUND OF THE INVENTION

The present invention relates to a method and apparatus for reducing impurities in a purified and pressurized liquid carbon dioxide stream.

Highly pressurized, purified liquid carbon dioxide is required for a variety of industrial processes. Such highly pressurized liquid is produced by purifying industrial grade liquid carbon dioxide that is available at about 13 to 23 bar (1.3 to 2.3 MPa) and then pumping the I quid to a pressure of anywhere from between about 20 and about 68 bar (2 to 6.8 MPa). The problem with pumping, however, is that impurities such as particulates or hydrocarbons can be introduced into the product stream as a byproduct of mechanical pump operation.

U.S. Pat. No. 6,327,872 discloses a method and apparatus for producing a pressurized high purity liquid carbon dioxide stream in which a feed stream composed of carbon dioxide vapor is purified within a purifying filter and then condensed within a condenser. The resulting liquid is then alternatively introduced and dispensed from two first and second pressure accumulation chambers on a continuous basis, in which one of the first and second pressure accumulation chambers acts in a dispensing role while the other is being filled.

High purity $CO_2$ can be used for the cleaning of optical components using the solvation and momentum transfer effects of $CO_2$ when sprayed onto the optics. These benefits are achieved only if the purity of the $CO_2$ is very high and the $CO_2$ is delivered at a high pressure.

SUMMARY

The present invention relates to a method (process) and apparatus for controlling and improving the purity of a pressurized liquid carbon dioxide stream in which a feed stream composed of carbon dioxide vapor is condensed into a liquid that is subsequently pressurized, such as by being heated within a chamber.

A process embodiment of the present invention calls for in a batch process for producing a purified, pressurized liquid carbon dioxide stream including providing a liquid carbon dioxide supply (10), introducing a carbon dioxide vapor feed stream into at least one purifying filter (13,14), condensing the purified vapor feed stream within a condenser (18) to form an intermediate liquid carbon dioxide stream, accumulating the intermediate liquid carbon dioxide stream in a receiver (20), introducing the intermediate liquid carbon dioxide stream into at least on high-pressure accumulation chamber (30), heating the high pressure accumulation chamber (30) to pressurize the intermediate liquid carbon dioxide stream contained therein to a delivery pressure, delivering a pressurized liquid carbon dioxide stream from the high-pressure accumulation chamber (30), and discontinuing delivery of the pressurized liquid carbon dioxide stream for replenishing the high pressure accumulation chamber (30), wherein the improvement comprises:
  withdrawing a liquid carbon dioxide stream (A) from the liquid carbon dioxide supply (10);
  introducing the liquid carbon dioxide stream (A) into a distillation column (B) having packing (C) therein, and stripping volatile impurities from the liquid carbon dioxide stream with the packing;
  vaporizing the liquid carbon dioxide stream (A) in a sump (D) of the distillation column (B) for providing a carbon dioxide vapor;
  withdrawing from a vaporized portion (F) of carbon dioxide vapor in the sump (D) a first vapor stream (G) vented from the distillation column (B);
  withdrawing from the vaporized portion (F) of the carbon dioxide vapor in the sump (D) a second vapor portion (H) vented from the sump into a conduit (I); and
  introducing the second vapor portion (H) in the conduit (I) into the carbon dioxide vapor feed stream upstream of the at least one purifying filter (13,14).

Still another process embodiment of the present invention calls for a batch process for producing a purified, pressurized liquid carbon dioxide stream, comprising: withdrawing a liquid carbon dioxide stream (A) from a liquid carbon dioxide supply (10); introducing the liquid carbon dioxide stream (A) into a distillation column (B) having packing (C) therein, and stripping volatile impurities from the liquid carbon dioxide stream with the packing; vaporizing the liquid carbon dioxide stream (A) in a sump (D) of the distillation column (B) for providing a carbon dioxide vapor; withdrawing from a vaporized portion (F) of carbon dioxide vapor in the sump (D) a first vapor stream (G) vented from the distillation column (B); withdrawing from the vaporized portion (F) of the carbon dioxide vapor in the sump (D) a second vapor portion (H) vented from the sump into a conduit (I); and introducing the second vapor portion (H) in the conduit (I) into a carbon dioxide vapor feed stream.

Still another process embodiment of the present invention calls for in a batch process for producing a purified, pressurized liquid carbon dioxide stream including distilling a feed stream including carbon dioxide vapor off a liquid carbon dioxide supply (10), introducing the carbon dioxide vapor feed stream into at least one purifying filter (13,14), condensing the purified carbon dioxide vapor feed stream within a condenser (18) to form an intermediate liquid carbon dioxide stream, accumulating the intermediate liquid carbon dioxide stream in a receiver (20), introducing the intermediate liquid carbon dioxide stream from the receiver (20) into at least on high-pressure accumulation chamber (30), heating the high pressure accumulation chamber (30) to pressurize the intermediate liquid carbon dioxide stream contained therein to a delivery pressure, delivering a pressurized liquid carbon dioxide stream from the high-pressure accumulation chamber (30), and discontinuing delivery of the pressurized liquid carbon dioxide stream for replenishing the high pressure accumulation chamber (30), wherein the improvement comprises:
  introducing the carbon dioxide vapor feed stream (L) into a distillation column (M) having packing (N) therein;
  condensing a first portion (O) of the carbon dioxide vapor feed stream (L) within a condenser (18) in fluid communication with the distillation column (M) to form another intermediate liquid carbon dioxide stream (T) and a liquid vent stream (Q); and
  introducing the another intermediate liquid carbon dioxide stream (T) into the receiver (20), and venting the liquid vent stream (Q) from a bottom of the distillation column (M).

Still another process embodiment of the present invention calls for a batch process for producing a purified, pressurized liquid carbon dioxide stream, comprising: introducing a carbon dioxide vapor feed stream (L) into a distillation column (M) having packing (N) therein; condensing a first portion (O) of the carbon dioxide vapor feed stream (L) within a condenser (18) in fluid communication with the distillation column (M) to form an intermediate liquid carbon dioxide stream (T) and a liquid vent stream (Q); and introducing the intermediate liquid carbon dioxide stream (T) into receiver (20), and venting the liquid vent stream (Q) from a bottom of the distillation column (M).

Still another process embodiment of the present invention calls for in a batch process for producing a purified, pressurized liquid carbon dioxide stream including providing a liquid carbon dioxide supply (10), introducing a carbon dioxide vapor feed stream into at least one purifying filter (13,14), condensing the purified vapor feed stream within a condenser (18) to form an intermediate liquid carbon dioxide stream, accumulating the intermediate liquid carbon dioxide stream in a receiver (20), introducing the intermediate liquid carbon dioxide stream into at least on high-pressure accumulation chamber (30), heating the high pressure accumulation chamber (30) to pressurize the intermediate liquid carbon dioxide stream contained therein to a delivery pressure, delivering a pressurized liquid carbon dioxide stream from the high-pressure accumulation chamber (30), and discontinuing delivery of the pressurized liquid carbon dioxide stream for replenishing the high pressure accumulation chamber (30), wherein the improvement comprises:

withdrawing a liquid carbon dioxide stream (A) from the liquid carbon dioxide supply (10);
introducing the liquid carbon dioxide stream (A) into a distillation column (B) having packing (C) therein, and stripping volatile impurities from the liquid carbon dioxide stream with the packing;
vaporizing the liquid carbon dioxide stream (A) in a sump (D) of the distillation column (B) for providing a carbon dioxide vapor;
withdrawing from a vaporized portion (F) of carbon dioxide vapor in the sump (D) a first vapor stream (G) vented from the distillation column (B);
withdrawing from the vaporized portion (F) of the carbon dioxide vapor in the sump (D) a second vapor portion (H) vented from the sump into a conduit (I);
introducing the second vapor portion (H) in the conduit (I) into the carbon dioxide vapor feed stream upstream of the at least one purifying filter (13,14); and
introducing the carbon dioxide vapor feed stream (L) into a distillation column (M) having packing (N) therein;
condensing a first portion (O) of the carbon dioxide vapor feed stream (L) within a condenser (18) in fluid communication with the distillation column (M) to form another intermediate liquid carbon dioxide stream (T) and a liquid vent stream (Q); and
introducing the another intermediate liquid carbon dioxide stream (T) into the receiver (20), and venting the liquid vent stream (Q) from a bottom of the distillation column (M).

An apparatus embodiment of the present invention calls for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream, a condenser (18) for condensing the carbon dioxide vapor feed stream into an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained therein to a delivery pressure, a sensor (45) for detecting when the high-pressure accumulation chamber (30) requires replenishment of liquid carbon dioxide (10), a flow network having conduits connecting the bulk supply tank, the condenser, the receiver and the high-pressure accumulation chamber and for discharging the pressurized liquid carbon dioxide stream therefrom, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves associated with said conduits to allow for isolation of components of the apparatus, wherein the improvement comprises:

a distillation column (B) having packing (C) therein and a sump (D) below the packing, the distillation column in fluid communication with the liquid carbon dioxide supply tank for receiving the liquid carbon dioxide stream and the packing stripping volatile impurities from the liquid carbon dioxide stream;
a heater (E) in contact with the liquid carbon dioxide stream in the sump (D) for vaporizing the liquid carbon dioxide stream in the sump;
a vent in the distillation column (B) from which a first vaporized portion (G) of carbon dioxide vapor in the sump (D) is withdrawn from the distillation column: and
a conduit (I) in fluid communication with the sump (D) and from which a second vaporized portion (H) of the carbon dioxide vapor in the sump is withdrawn into the conduit (I) to be introduced into the carbon dioxide vapor feed stream.

Still another apparatus embodiment of the present invention calls for an apparatus for producing a purified, pressurized liquid carbon dioxide stream, comprising: a distillation column (B) having packing (C) therein and a sump (D) below the packing, the distillation column in fluid communication with the liquid carbon dioxide supply tank for receiving the liquid carbon dioxide stream and the packing stripping volatile impurities from the liquid carbon dioxide stream; a heater (E) in contact with the liquid carbon dioxide stream in the sump (D) for vaporizing the liquid carbon dioxide stream in the sump; a vent in the distillation column (B) from which a first vaporized portion (G) of carbon dioxide vapor in the sump (D) is withdrawn from the distillation column: and a conduit (I) in fluid communication with the sump (D) and from which a second vaporized portion (H) of the carbon dioxide vapor in the sump is withdrawn into the conduit (I) to be introduced into the carbon dioxide vapor feed stream.

Still another apparatus embodiment of the present invention calls for in an apparatus for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream, a condenser (18) for condensing the carbon dioxide vapor feed stream into an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained therein to a delivery pressure, a sensor (45) for detecting when the high-pressure accumulation chamber (30) requires replenishment of liquid carbon dioxide (10), a flow network having conduits connecting the bulk supply tank, the condenser, the receiver and the high-pressure accumulation chamber and for discharging the pressurized liquid carbon dioxide stream therefrom, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves associated with said conduits to allow for isolation of components of the apparatus, wherein the improvement comprises:

a distillation column (M) having packing (N) therein for receiving the carbon dioxide vapor feed stream (L) therein;

a condenser (18) in fluid communication with the distillation column (M) for condensing a first portion (O) of the carbon dioxide vapor feed stream (L) within the condenser to form another intermediate liquid carbon dioxide stream (T) and a liquid vent stream (Q); and a receiver (20) for receiving the another intermediate liquid carbon dioxide stream (T) into the receiver, and an outlet in the distillation column (M) through which is vented the liquid vent stream (Q).

Still another apparatus embodiment of the present invention calls for as apparatus for producing a purified, pressurized liquid carbon dioxide stream, comprising: a distillation column (M) having packing (N) therein for receiving the carbon dioxide vapor feed stream (L) therein; a condenser (18) in fluid communication with the distillation column (M) for condensing a first portion (O) of the carbon dioxide vapor feed stream (L) within the condenser to form another intermediate liquid carbon dioxide stream (T) and a liquid vent stream (Q); and a receiver (20) for receiving the another intermediate liquid carbon dioxide stream (T) into the receiver, and an outlet in the distillation column (M) through which is vented the liquid vent stream (Q).

Still another apparatus embodiment of the present invention calls for an apparatus for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream, a condenser (18) for condensing the carbon dioxide vapor feed stream into an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained therein to a delivery pressure, a sensor (45) for detecting when the high-pressure accumulation chamber (30) requires replenishment of liquid carbon dioxide (10), a flow network having conduits connecting the bulk supply tank, the condenser, the receiver and the high-pressure accumulation chamber and for discharging the pressurized liquid carbon dioxide stream therefrom, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves associated with said conduits to allow for isolation of components of the apparatus, wherein the improvement comprises:

a distillation column (B) having packing (C) therein and a sump (D) below the packing, the distillation column in fluid communication with the liquid carbon dioxide supply tank for receiving the liquid carbon dioxide stream and the packing stripping volatile impurities from the liquid carbon dioxide stream;

a heater (E) in contact with the liquid carbon dioxide stream in the sump (D) for vaporizing the liquid carbon dioxide stream in the sump;

a vent in the distillation column (B) from which a first vaporized portion (G) of carbon dioxide vapor in the sump (D) is withdrawn from the distillation column:

a conduit (I) in fluid communication with the sump (D) and from which a second vaporized portion (H) of the carbon dioxide vapor in the sump is withdrawn into the conduit (I) to be introduced into the carbon dioxide vapor feed stream; and a distillation column (M) having packing (N) therein for receiving the carbon dioxide vapor feed stream (L) therein;

a condenser (18) in fluid communication with the distillation column (M) for condensing a first portion (O) of the carbon dioxide vapor feed stream (L) within the condenser to form another intermediate liquid carbon dioxide stream (T) and a liquid vent stream (Q); and a receiver (20) for receiving the another intermediate liquid carbon dioxide stream (T) into the receiver, and an outlet in the distillation column (M) through which is vented the liquid vent stream (Q).

BRIEF DESCRIPTION OF THE DRAWINGS

For a more complete understanding of the present inventive embodiments, reference may be had to the following detailed description taken in connection with the accompanying drawing Figures, of which.

DETAILED DESCRIPTION

An apparatus and process are provided including introducing a feed stream comprising carbon dioxide vapor into a purifying filter, such as for carrying out gas phase purification; condensing the purified $CO_2$ stream, such as by use of mechanical refrigeration or cryogenic refrigerants; isolating the high purity liquid $CO_2$; and, vaporizing a portion of the liquid $CO_2$, such as by using a heater element, to achieve the target pressure.

In one embodiment, the apparatus and process operating cycle is designed to maintain a continuous supply of high-pressure pure liquid carbon dioxide for a period up to about 16 hours, with about 8 hours to reset the system, that is, to replenish the high purity liquid carbon dioxide available for delivery. An example of the operating cycle and corresponding "Modes", and the logic controlling the cycle of the system is presented below in Table 1.

By way of example, in one embodiment, gaseous carbon dioxide is withdrawn from a bulk tank of liquid carbon dioxide, where single stage distillation purification occurs, removing a majority of the condensable hydrocarbons. From the bulk tank, the gaseous carbon dioxide passes through a coalescing filter, providing a second level of purification. The gaseous carbon dioxide is re-condensed in a low-pressure accumulator, providing the third level of purification by removing the non-condensable hydrocarbons. The low-pressure liquid is then transferred to a high-pressure accumulator. Once filled, an electric heater pressurizes the accumulator up to the desired pressure set-point. Upon reaching the pressure set point, the accumulator enters Ready mode (Mode 4, as in Table 1). In one embodiment, the process maintains high purity liquid carbon dioxide to the point of use for a period of up to about 16 hours. After the liquid has been expended, the system may return to Mode 1 and repeat the operating sequence.

Figure 1:
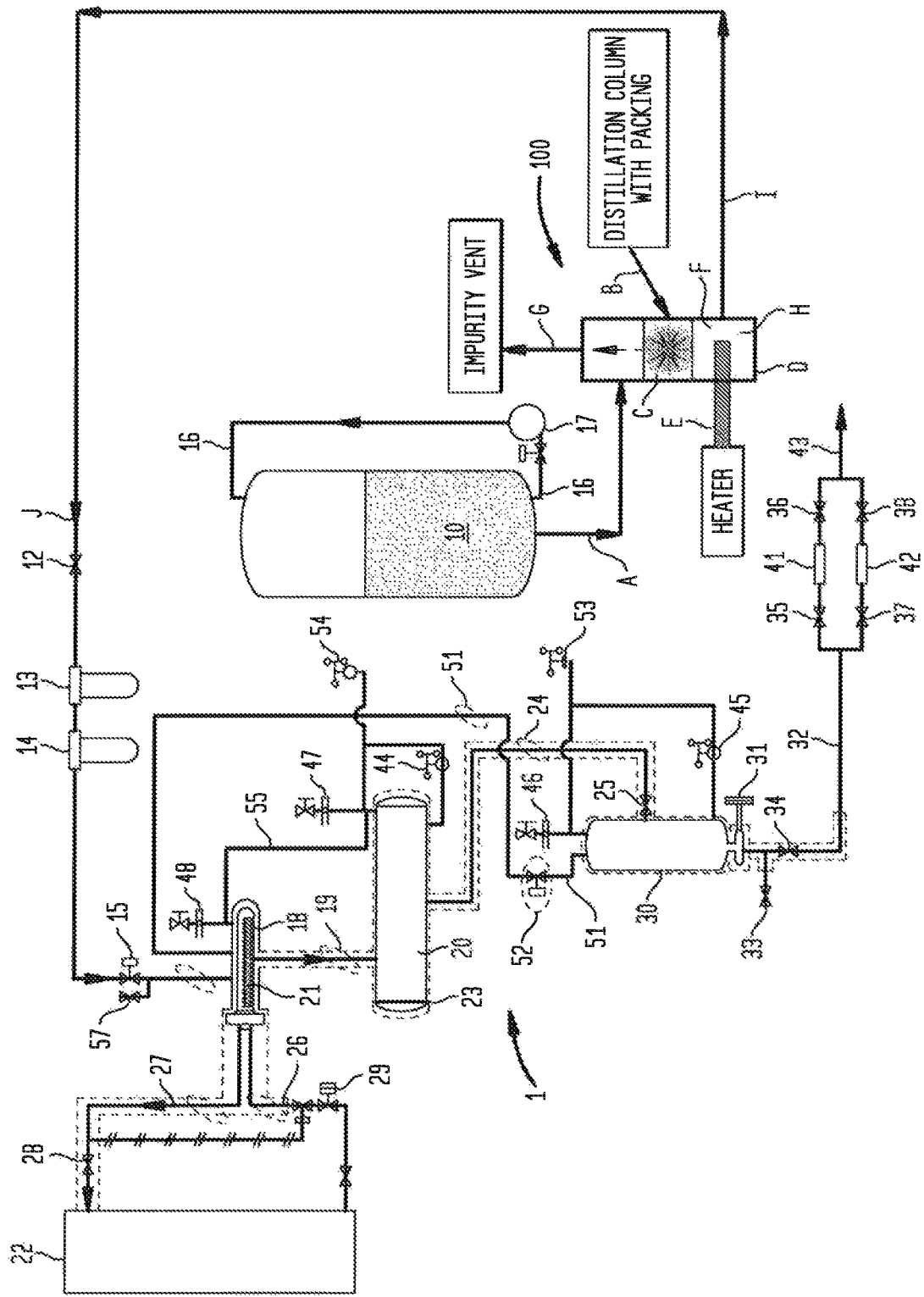
FIG. 1 is a schematic view of a first embodiment of an apparatus in a system for carrying out a first embodiment of a process according to the present invention.
Figure 2:
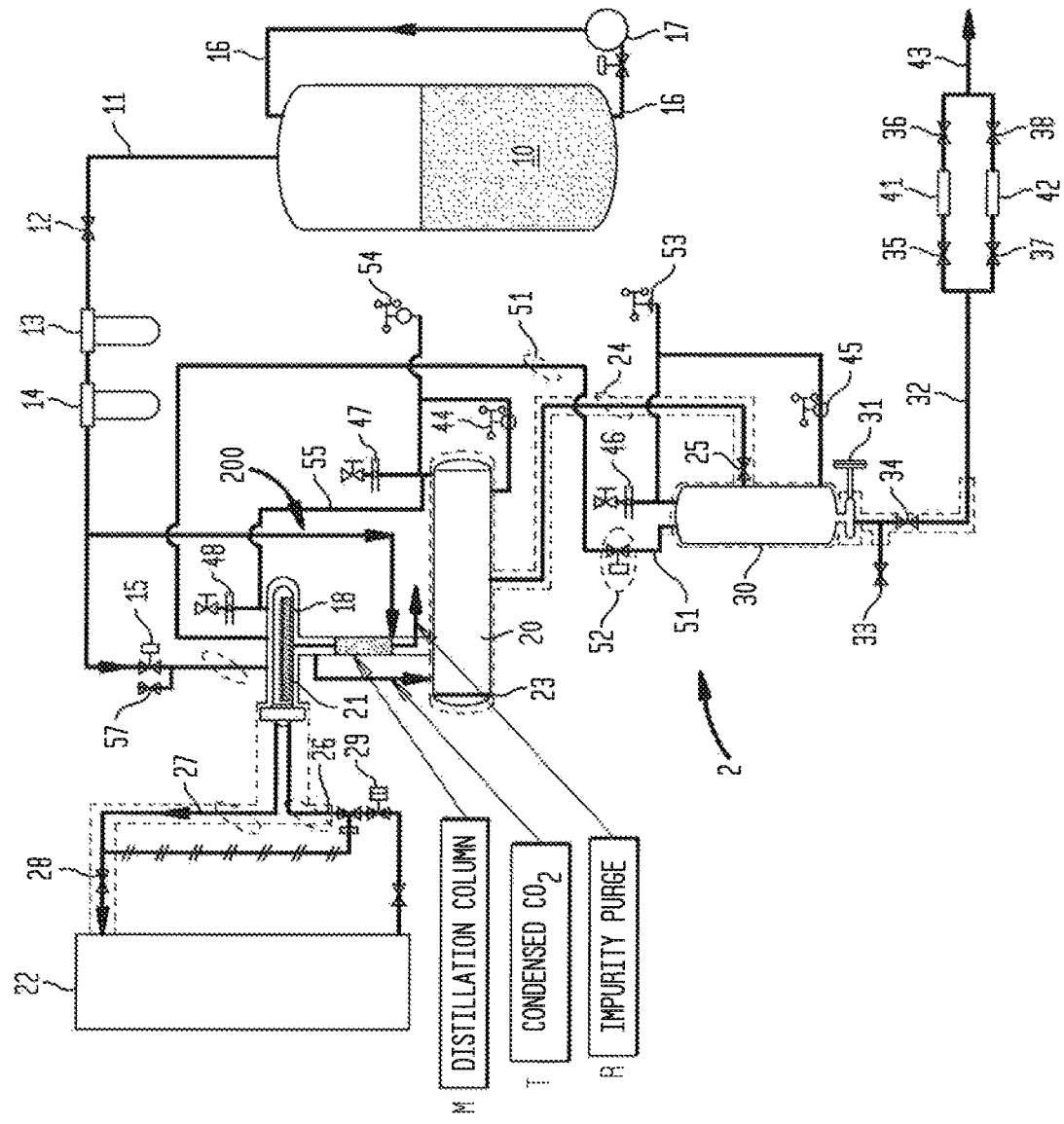
FIG. 2 is a schematic view of a second embodiment of an apparatus in the system for carrying out a second embodiment of a process according to the present invention.

With reference to FIGS. 1 and 2, a carbon dioxide purification and supply system is shown generally at 1 and 2. From a bulk supply of liquid carbon dioxide 10, a feed stream 11 comprising carbon dioxide vapor is distilled in a first purification stage, and is introduced into a purifying particle filter 13 and a coalescing filter 14 which can be any of a number of known, commercially available filters, for a second stage purification. Valves 12 and 15 are provided to isolate the purifying filter(s) 13,14. The bulk supply may be a tank of liquid $CO_2$ maintained at about 300 psig (2.1 MPa) and about 0° F. (−18° C.). As carbon dioxide vapor is drawn out of the bulk supply tank, a portion of the liquid carbon dioxide in the bulk tank is drawn through conduit 16 and introduced to a pressure build device 17 such as an electric or steam vaporizer or the like, to maintain the pressure relatively constant within the bulk supply tank even though carbon dioxide vapor is being removed. The vaporizer takes liquid $CO_2$ from the supply tank and uses heat to change the $CO_2$ from the liquid phase to the gas phase. The resulting $CO_2$ gas is introduced back into the headspace of the supply tank.

The feed stream 11 after having been purified in the second stage is introduced into a condenser 18 that is provided with a heat exchanger 21 to condense the carbon dioxide vapor into a liquid 19. Such condensation is effected by an external refrigeration unit 22 that circulates a refrigeration stream through the heat exchanger, preferably of shell and tube design. Isolation valves 28 and 29 can be provided to isolate refrigeration unit 22 and its refrigerant feed line 26 and return line 27. The liquid carbon dioxide 19 is temporarily stored in a receiver vessel 20, that is, a low pressure accumulator. The level of liquid in the receiver vessel 20 is controlled by a level sensor 44 (such as a level differential pressure transducer) and pressure sensor 54 (such as a pressure transducer) via a controller (not shown), such as a programmable logic computer.

An intermediate liquid stream comprising high purity $CO_2$ liquid 24 is introduced from the receiver vessel 20 into a high-pressure accumulation chamber 30. The high-pressure accumulation chamber 30 is heated, for example, by way of an electrical heater 31, to pressurize the liquid to a delivery pressure of the pressurized liquid carbon dioxide stream to be produced by the system 1.

An insulation jacket 23, such as formed of polyurethane or the equivalent, can be disposed about the condenser 18, the conduit for carrying the liquid $CO_2$ 19, the high pressure accumulation vessel 30, and the outlet conduit 32 and associated valves to maintain the desired temperature of the liquid $CO_2$.

A valve network controls the flow within the system 1. In this regard, fill control valve 25 controls the flow of the intermediate liquid stream from the receiver vessel 20 to the high-pressure accumulation chamber 30. Control of the flow of the high pressure liquid carbon dioxide through outlet conduit 32 is effected by product control valve 34. Drain valve 33 also is connected to outlet conduit 32 for sampling or venting, as needed. The venting of the high-pressure accumulation chamber 30 via vent line (conduit) 51 to the condenser 18 is controlled by vent control valve 52. A pressure relief line 55 from the condenser 18 to the receiver vessel 20 passes vapor from the receiver vessel 20 back to the condenser 18 as liquid carbon dioxide 19 enters the receiver vessel 20.

A pressure sensor 53 (such as a pressure transducer) monitors the pressure and a level sensor 45 (such as a level differential pressure transducer) monitors the level of liquid carbon dioxide within the high-pressure accumulation chamber 30 in order to control the heater 31 for vaporizing a portion of the liquid carbon dioxide, so that a desired pressure of the liquid carbon dioxide can be supplied therefrom. A temperature sensor (not shown) can monitor the liquid carbon dioxide temperature in the heater 31 or accumulation chamber 30.

The process has six operating sequences, or modes, for the high-pressure carbon dioxide accumulator (AC-1). The cycle logic controls the valves, heaters and refrigeration according to these modes. Table 1 lists the possible operation modes.

TABLE 1

| 1. High-Pressure Accumulator Status Modes. | | |
|---|---|---|
| Mode | Designation | Description |
| Offline | 0 | All valves closed, heaters off, refrigeration off. |
| Vent | 1 | Depressurize accumulator 30 prior to refilling with low-pressure liquid. Vent valve 52 open. Fill valve 25 and product valve 34 closed. Refrigeration on. |
| Fill | 2 | Filling accumulator 30 with low-pressure liquid. Vent valve 52 and fill valve 25 open. Product valve 34 closed. Refrigeration on. |
| Pressurize | 3 | Pressurizing accumulator 30 up to the set point (i.e. using electric immersion heater 31). Vent, fill and product valves closed. |
| Ready | 4 | System hold at pressure awaits dispensing high pressure liquid. Vent, fill and product valves closed. |
| Online | 5 | System supplying high-pressure liquid. Product valve 34 open. Vent valve 52 and fill valve 25 closed. |

High pressure carbon dioxide from the high pressure accumulator travels through outlet conduit 32 and may be again purified in a further purification stage by one of two particle filters 41 and 42. The particle filters 41 and 42 can be isolated by valves 35,36 and 37,38 respectively, so that one filter can be operational while the other is isolated from the conduit by closure of its respective valves, for cleaning or replacement. The high pressure, purified liquid carbon dioxide stream 43 emerges from the final filtration stage for use in the desired process, such as cleaning of optic elements.

The optical component to be processed is contacted with high purity $CO_2$ directly in a cleaning chamber, such that the contamination residue is dissolved and dislodged by the $CO_2$. The liquid $CO_2$ may be supplied to the cleaning chamber at about 700 psig to about 950 psig (4.8 MPa to 6.6 MPa) or higher.

When the high-pressure accumulation chamber 30 is near empty, as sensed by level sensor 45 and/or the pressure sensor 53, vent control valve 52 opens to vent the high-pressure accumulation chamber. Fill control valve 25 opens to allow intermediate liquid stream 24 to fill the high-pressure accumulation chamber 30. When the differential pressure sensor indicates the completion of the filling, control valves 25 and 52 close, and the liquid carbon dioxide is heated by electrical heater 31 to again pressurize the liquid within the high-pressure accumulation chamber 30.

Pressure relief valves 46,47,48 may be provided for safety purposes, in connection with the high-pressure accumulation chamber 30, receiver vessel 20, and condenser 18, respectively.

Referring again to FIG. 1, another embodiment of the system 1 includes an apparatus 100 for controlling and removing relatively lighter impurities (such as those having a boiling point less than $CO_2$, for example $N_2$, $H_2$ or $O_2$) from the liquid $CO_2$ stream, which apparatus includes a conduit "A" connected to a bottom of the bulk storage tank having the liquid carbon dioxide 10 therein, and in fluid communication with the liquid $CO_2$. The liquid $CO_2$ is removed as a feed stream from the tank through the conduit A and introduced into an inlet of a distillation column "B" having packing "C" therein. The liquid $CO_2$ flows downward along an interior of the column B and through the packing C into a sump "D" of the column, where a heater "E" is disposed near a bottom of the sump. The liquid $CO_2$ is vaporized by the heater E, whereby a portion "F" of the vaporized $CO_2$ rises through the packing C as a vapor stream "G" to remove the lighter impurities from the stream and thereafter be vented to the atmosphere as shown in FIG. 1. Another of the vapor portion F is exhausted as a vapor stream "H" through a conduit "I", the conduit I having one end in fluid communication with the sump D and another end "J" in fluid communication with the valve 12.

Another exemplary embodiment of an apparatus according to the present invention is shown generally at FIG. 2. Elements shown in FIG. 2 which correspond to the elements described above with respect to FIG. 1 have been designated by corresponding reference numbers. The elements of FIG. 2 are designed for use in the same manner as those shown in FIG. 1, unless otherwise stated.

With reference to FIG. 2, an alternative impurity control for a high pressure carbon dioxide purification and supply system is shown generally at 2. From a bulk supply of liquid carbon dioxide 10, a feed stream 11 comprising carbon dioxide vapor is distilled in a first purification stage, and is introduced into a purifying particle filter 13 and a coalescing filter 14 which can be any of a number of known, commercially available filters, for a second stage purification. Valves 12 and 15 are provided to isolate the purifying filter(s) 13,14.

The feed stream 11 after having been purified in the second stage is introduced into the receiver vessel 20 that is provided with a heat exchanger 21 to condense the carbon dioxide vapor into a liquid, Such condensation is effected by an external refrigeration unit 22 that circulates a refrigeration stream through the heat exchanger, preferably of shell and tube design. Isolation valves 28 and 29 can be provided to isolate refrigeration unit 22 and its refrigerant feed line 26 and return line 27. The liquid carbon dioxide is temporarily stored in the receiver vessel 20, that is, a low pressure accumulator.

As may be appreciated, since vapor is being condensed within receiver 20, a separation of any impurities present within the vapor might be effected by which the more volatile impurities would remain in uncondensed vapor and less volatile impurities would be condensed into the liquid. Although not illustrated, sample lines may be connected to the receiver vessel 20 for sampling and drawing off liquid and vapor as necessary to lower impurity concentration within the receiver.

An intermediate liquid stream comprising high purity liquid 24 is introduced into first and second pressure accumulation chambers 30a and 30b. First and second pressure accumulation chambers 30a and 30b are heated, preferably by way of electrical heater 31, to pressurize the liquid to a delivery pressure of the pressurized liquid carbon dioxide stream to be produced by apparatus 2.

A valve network controls the flow within the system. In this regard, fill control valve 25 controls the flow of the intermediate liquid stream from the receiver 20 to the high-pressure accumulation chambers 30a and 30b. Control of the flow of the high pressure liquid carbon dioxide through outlet conduit 32 is effected by product control valve 34. Drain valve 33 also is connected to outlet conduit 32 for sampling or venting, as desired. The venting of the high-pressure accumulation chamber 30 via vent line (conduit) 51 to the condenser 18 is controlled by vent control valve 52.

First and second high pressure accumulation chambers 30 and 30b may be interconnected by conduit 39 without an isolation valve interposed there between, so that both act effectively as a single unit, at lower cost.

A pressure sensor 53 (such as a pressure transducer) monitors the pressure and a level sensor 45 (such as a level differential pressure transducer) monitors the level of liquid carbon dioxide within the high-pressure accumulators 30a and 30b in order to control the heater 31 for vaporizing a portion of the liquid carbon dioxide, so that a desired pressure of the liquid carbon dioxide can be supplied therefrom.

High pressure carbon dioxide from the high pressure accumulator travels through outlet conduit 32 and is again purified in a further purification stage by one of two particle filters 41 and 42. The particle filters 41 and 42 can be isolated by valves 35,36 and 37,38, respectively, so that one filter can be operational while the other is isolated from the conduit by closure of its respective valves, for cleaning or replacement. The high pressure, purified liquid carbon dioxide stream 43 emerges from the final filtration stage for use in the desired process as described above. When the requirement for the purified carbon dioxide stream 43 is no longer needed, or can no longer be met, the apparatus begins a replenishment cycle. That is, after Mode 5 is complete, the system can return sequentially to Mode 1, Mode 2, and soon, as set forth in Table I.

Further features of the system and process include a fully automated microprocessor controller which continuously monitors system operation providing fault detection, pressure control and valve sequencing, ensuring purifier reliability, while minimizing operator involvement. By way of example and not limitation, level sensors 44,45, pressure sensors 53,54, and temperature sensors can provide infomlation for the controller, in order to provide instructions to flow control valves 15,34,52, or pressure relief valves 46,47,48. The valves in the system may be actuated pneumatically, by pulling a tap off of the $CO_2$ vapor conduit such as at valve 57, to supply gas for valve actuation.

Figure 3:
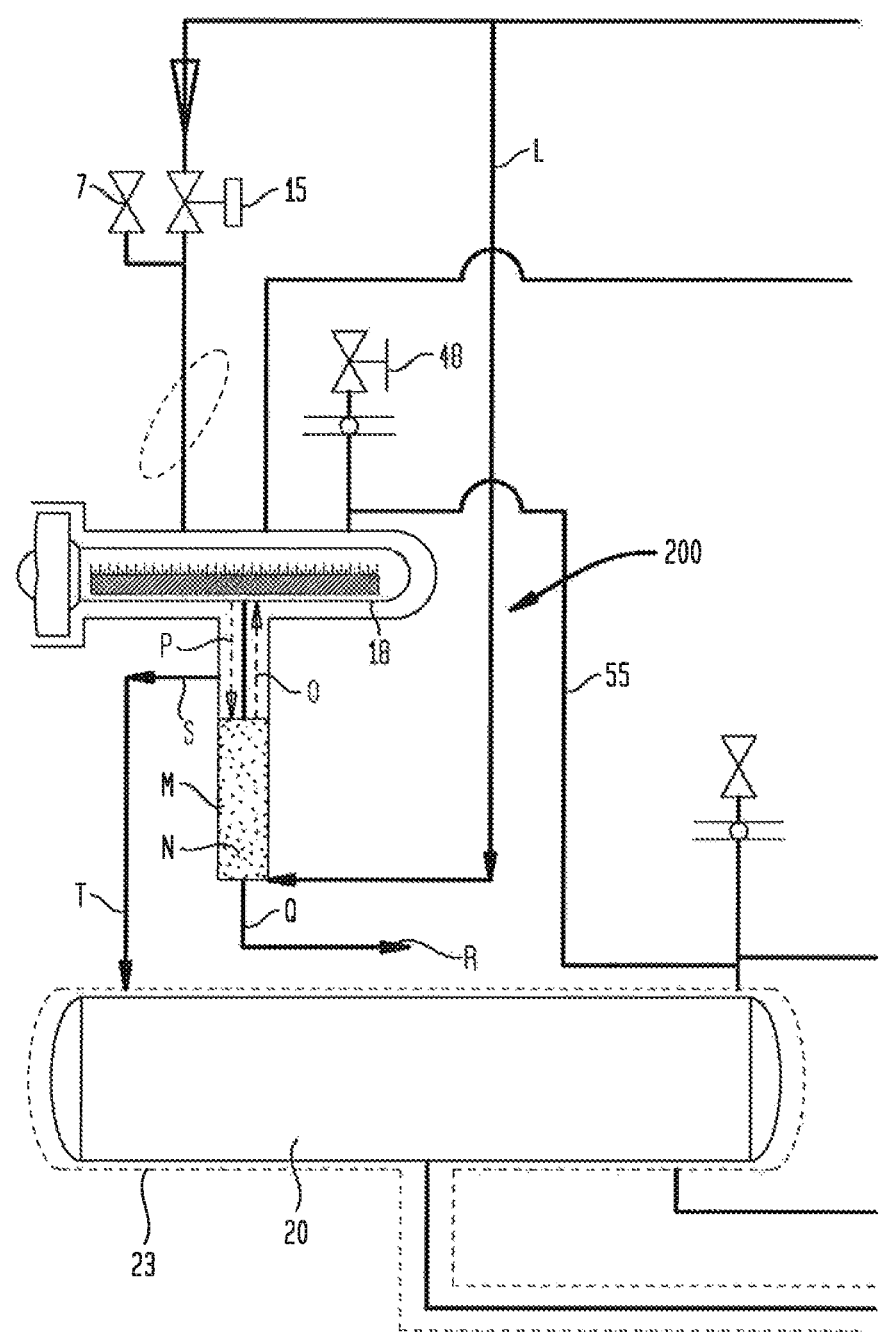
FIG. 3 is a schematic view of an enlarged portion of the second embodiment shown in FIG. 2.

Referring to FIGS. 2 and 3 there is shown another embodiment of an apparatus 200 for controlling and removing relatively heavier impurities (having a boiling point greater than $CO_2$, for example, water, methanol or ethanol) from the liquid $CO_2$ stream in the system 2. The apparatus embodiment 200, generally, reconfigures the vapor feed. That is, instead of feeding the vaporized $CO_2$ directly to the condenser 18, the $CO_2$ vapor is directed to a distillation column arranged between the condenser 18 and the receiver vessel 20. In this embodiment, $CO_2$ vapor rises through the distillation column and is condensed in the condenser 18. A portion of the condensed $CO_2$ runs back down through the column and washes out the heavier impurities from the vapor stream so that the heavier impurities are purged from a bottom of the column. A remaining condensed portion of the $CO_2$ bypasses the column and is sent to the receiver vessel.

In particular, and referring also to the apparatus 200 shown in FIG. 3, the $CO_2$ vapor feed stream 11 downstream of the coalescing filter 14 is provided into a conduit "L". The feed stream 11 contains trace amounts of heavy impurities. The conduit L is connected to and in fluid communication with an inlet at a bottom of a distillation column "M". A vapor-liquid contact material "N", such as for example structured packing or random packing, is disposed at an interior of the column M. The feed stream vapor travels upward at an interior of the column M through the packing N. A first portion "O" of the vapor enters the condenser 18 where the vapor is condensed. The resulting condensed liquid "P" returns to the column M, whereupon such liquid runs down the packing N and is in countercurrent contact with the uprising first vapor portion O. This condensed liquid washes out heavy impurities in the uprising vapor portion O and forms an impurity laden liquid stream "Q" that is purged from the column M through an outlet at a bottom of the column into a conduit "R", whereupon the stream Q is vented to the atmosphere. A second portion "S" of the liquid from the condensed liquid P, which is now free of the heavy impurities, is removed from a top of the distillation column M and sent through a conduit "T" to an inlet of the receiver vessel 20.

Figure 4:
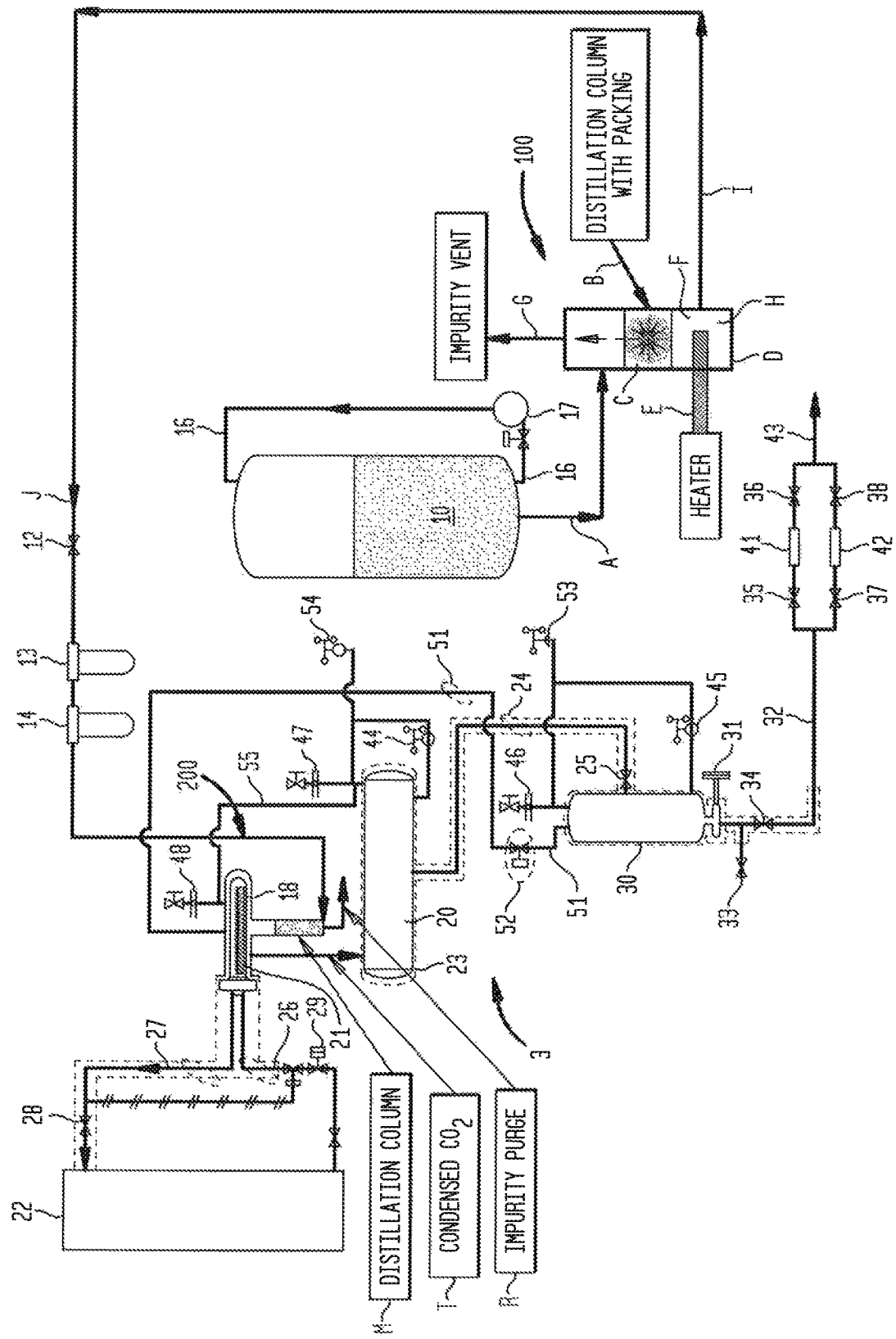
FIG. 4 is a schematic view of the first and second embodiments in the system for carrying out the first and second embodiments according to the present invention.

FIG. 4 shows the apparatus embodiments 100,200 incorporated into, for example, the system 2 of FIG. 2 to remove both lighter and heavier impurities from a liquid $CO_2$ feed stream. It is understood however that the apparatus embodiments 100,200 can also be incorporated into the system 1 of FIG. 1 to remove both lighter and heavier impurities from a liquid $CO_2$ feed stream.

The systems 1,2 and the apparatus embodiments 100,200 above may include system alarms to detect potential hazards, such as temperature or pressure excursions, to ensure system and apparatus integrity. Alarm and warning conditions may be indicated at the operator interface and may be accompanied by an alarm beeper. A human machine interface displays valve operation, operating mode, warning and alarm status, sequence timers, system temperature and pressure, heater power levels, and system and apparatus cycle count.

In summary, industrial grade $CO_2$ gas may be pulled off of the head space of a supply tank, where the supply tank acts as a single stage distillation column (Stage 1). The higher purity gas phase is passed through at least a coalescing filter, reducing the condensable hydrocarbon concentration and resulting in a higher level of purity (Stage 2). Stage 3 includes a mechanical or cryogenic refrigeration system to effect a phase change from the gas phase back to the liquid phase. All non-condensable hydrocarbons and impurities are thus removed from the operative carbon dioxide liquid stream.

The subject apparatus 100,200 and related processes of same permit cyclic operation of the process, rather than continuous feed operation. The apparatus and processes are also of a more economical design (by approximately half) due to the reduction from continuous or multi-batch to single batch operation. The apparatus and processes are further of a more economical design than prior art systems, due to the omission of accessory equipment like boilers and condensers. The reduced footprint allows for the apparatus embodiments to be located closer to the point of use, resulting in reduced liquid carbon dioxide boil-off.

It will be understood that the embodiment(s) described herein is/are merely exemplary and that a person skilled in the art may make many variations and modifications without departing from the spirit and scope of the invention. All such variations and modifications are intended to be included within the scope of the invention as described and claimed herein. It should be understood that the embodiments described above are not only in the alternative, but can be combined.

What is claimed is:
1. In an apparatus for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream to form a purified carbon dioxide vapor feed stream, a condenser (18) for condensing the purified carbon dioxide vapor feed stream to form an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained in the high-pressure accumulation chamber to a delivery pressure, a sensor (45) for detecting when the high-pressure accumulation chamber (30) requires replenishment of liquid carbon dioxide (10), a flow network having conduits connecting the liquid carbon dioxide supply tank to the condenser, the condenser to the receiver, the receiver to the high-pressure accumulation chamber, and for discharging the pressurized liquid carbon dioxide stream from the high-pressure accumulation chamber, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves (46,47,48,12,15) associated with said conduits to allow for isolation of the condenser (18), the receiver (20), the high-pressure accumulation chamber (30), and the at least one purifying filter (13,14) of the apparatus, wherein the improvement comprises:
 a distillation column (B) having packing (C) therein and a sump (D) below the packing, the distillation column in fluid communication with the liquid carbon dioxide supply tank for receiving the liquid carbon dioxide stream and wherein the packing is for stripping volatile impurities from the liquid carbon dioxide stream;
 another heater (E) in contact with liquid carbon dioxide in the sump (D) for vaporizing the liquid carbon dioxide in the sump;

a vent in the distillation column (B) from which a first vaporized portion (G) of carbon dioxide vapor in the sump (D) is withdrawn from the distillation column; and a conduit (I) in fluid communication with the sump (D) and from which a second vaporized portion (H) of the carbon dioxide vapor in the sump is withdrawn into the conduit (I) to be introduced into the carbon dioxide vapor feed stream.

2. The apparatus of claim 1, further comprising a particle filter connected to the flow network for the apparatus to filter the pressurized liquid carbon dioxide stream.

3. The apparatus of claim 1, wherein the condenser (18) further comprises an external refrigeration circuit (22) and a heat exchanger (21) to condense the vapor feed stream through indirect heat exchange with a refrigerant stream.

4. The apparatus of claim 1, wherein the condenser (18) is integral with the receiver (20).

5. The apparatus of claim 1, wherein the heater (31) comprises an electrical heater for the high-pressure accumulation chamber (30).

6. The apparatus of claim 1, wherein the at least one purifying filter (13,14) for the carbon dioxide vapor feed stream is a filter selected from the group consisting of a coalescing filter and a particle filter.

7. The apparatus of claim 1, wherein the sensor is selected from the group consisting of a level sensor and a pressure sensor.

8. In an apparatus for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream to form a purified carbon dioxide vapor feed stream, a condenser (18) for condensing the purified carbon dioxide vapor feed stream to form an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained in the high-pressure accumulation chamber to a delivery pressure, a sensor (45) for detecting when the high-pressure accumulation chamber (30) requires replenishment of liquid carbon dioxide (10), a flow network having conduits connecting the liquid carbon dioxide supply tank to the condenser, the condenser to the receiver, the receiver to the high-pressure accumulation chamber, and for discharging the pressurized liquid carbon dioxide stream from the high-pressure accumulation chamber, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves (46,47,48,12,15) associated with said conduits to allow for isolation of the condenser (18), the receiver (20), the high-pressure accumulation chamber (30), and the at least one purifying filter (13,14) of the apparatus, wherein the improvement comprises:

a distillation column (M) having packing (N) therein for receiving the purified carbon dioxide vapor feed stream (L) in the packing;

the condenser (18) in fluid communication with the distillation column (M) for condensing a first portion (O) of the purified carbon dioxide vapor feed stream (L) within the condenser to form another intermediate liquid carbon dioxide stream (T) and a liquid vent stream (Q); and a receiver (20) for receiving the another intermediate liquid carbon dioxide stream (T) into the receiver, and an outlet in the distillation column (M) through which is vented the liquid vent stream (Q).

9. The apparatus of claim 8, further comprising a particle filter connected to the flow network for the apparatus to filter the pressurized liquid carbon dioxide stream.

10. The apparatus of claim 8, wherein the condenser (18) further comprises an external refrigeration circuit (22) and a heat exchanger (21) to condense the vapor feed stream through indirect heat exchange with a refrigerant stream.

11. The apparatus of claim 8, wherein the condenser (18) is integral with the receiver (20).

12. The apparatus of claim 8, wherein the heater (31) comprises an electrical heater for the high-pressure accumulation chamber (30).

13. The apparatus of claim 8, wherein the at least one purifying filter (13,14) for the carbon dioxide vapor feed stream is a filter selected from the group consisting of a coalescing filter and a particle filter.

14. The apparatus of claim 8, wherein the sensor is selected from the group consisting of a level sensor and a pressure sensor.

15. In an apparatus for producing a purified, pressurized liquid carbon dioxide stream, including a liquid carbon dioxide supply tank (10) for distilling off a feed stream comprising carbon dioxide vapor, at least one purifying filter (13,14) for purifying the carbon dioxide vapor feed stream to form a purified carbon dioxide vapor feed stream, a condenser (18) for condensing the purified carbon dioxide vapor feed stream to form an intermediate liquid carbon dioxide stream, a receiver (20) for accumulating the intermediate liquid carbon dioxide stream, a high-pressure accumulation chamber (30) for accepting the intermediate liquid carbon dioxide stream from the receiver (20), a heater (31) for heating the high-pressure accumulation chamber (30) for pressurizing the carbon dioxide liquid contained in the high-pressure accumulation chamber to a delivery pressure, a sensor (45) for detecting when the high-pressure accumulation chamber (30) requires replenishment of liquid carbon dioxide (10), a flow network having conduits connecting the liquid carbon dioxide supply tank to the condenser, the condenser to the receiver, the receiver to the high-pressure accumulation chamber, and for discharging the liquid carbon dioxide stream from the high-pressure accumulation chamber, the conduits of said flow network including a vent line (51) from the high-pressure accumulation chamber (30) to the condenser (18) to facilitate introduction of the intermediate liquid carbon dioxide stream into the high-pressure accumulation chamber, and the flow network having valves (46,47,48,12,15) associated with said conduits to allow for isolation of the condenser (18), the receiver (20), the high-pressure accumulation chamber (30), and the at least one purifying filter (13,14) of the apparatus, wherein the improvement comprises;

a distillation column (B) having packing (C) therein and a sump (D) below the packing, the distillation column in fluid communication with the liquid carbon dioxide supply tank for receiving the liquid carbon dioxide stream and wherein the packing is for stripping volatile impurities from the liquid carbon dioxide stream;

another heater (E) in contact with liquid carbon dioxide in the sump (D) for vaporizing the liquid carbon dioxide in the sump;

a vent in the distillation column (B) from which a first vaporized portion (G) of carbon dioxide vapor in the sump (D) is withdrawn from the distillation column;

a conduit (I) in fluid communication with the sump (D) and from which a second vaporized portion (H) of the carbon dioxide vapor in the sump is withdrawn into the conduit (I) to be introduced into the carbon dioxide vapor feed stream; and another distillation column (M) having an outlet, and another packing (N) in the another distillation column for receiving the purified carbon dioxide vapor feed stream (L) in the another packing;

the condenser (18) in fluid communication with the distillation column (M) for condensing a first portion (O) of the purified carbon dioxide vapor feed stream (L) within the condenser to form another intermediate liquid carbon dioxide stream (T) and a liquid vent stream (Q); and a receiver (20) for receiving the another intermediate liquid carbon dioxide stream (T) into the receiver, wherein the outlet in the another distillation column (M) is through which the liquid vent stream (Q) is vented.

16. The apparatus of claim 15, further comprising a particle filter connected to the flow network for the apparatus to filter the pressurized liquid carbon dioxide stream.

17. The apparatus of claim 15, wherein the condenser (18) further comprises an external refrigeration circuit (22) and a heat exchanger (21) to condense the vapor feed stream through indirect heat exchange with a refrigerant stream.

18. The apparatus of claim 15, wherein the condenser (18) is integral with the receiver (20).

19. The apparatus of claim 15, wherein the heater (31) comprises an electrical heater for the high-pressure accumulation chamber (30).

20. The apparatus of claim 15, wherein the at least one purifying filter (13,14) for the carbon dioxide vapor feed stream is a filter selected from the group consisting of a coalescing filter and a particle filter.

21. The apparatus of claim 15, wherein the sensor is selected from the group consisting of a level sensor and a pressure sensor.

* * * * *